(12) United States Patent
Ergen

(10) Patent No.: US 8,737,325 B2
(45) Date of Patent: May 27, 2014

(54) METHOD AND SYSTEM FOR AUTOMATICALLY MANAGING OPERATIONS OF AN IPTV LOCATED IN A FEMTOCELL NETWORK

(75) Inventor: Mustafa Ergen, Istanbul (TR)

(73) Assignee: ARGELA Yazilim be Biliş im Teknolojlleri San. ve Tic. A.Ş., Istanbul (TR)

( * ) Notice: Subject to any disclaimer, the term of this patent is extended or adjusted under 35 U.S.C. 154(b) by 94 days.

(21) Appl. No.: 12/874,221

(22) Filed: Sep. 1, 2010

(65) Prior Publication Data
US 2012/0051295 A1    Mar. 1, 2012

(51) Int. Cl.
*H04W 72/04*    (2009.01)
*H04W 84/04*    (2009.01)
*H04W 64/00*    (2009.01)
*H04W 72/06*    (2009.01)

(52) U.S. Cl.
CPC .......... *H04W 84/045* (2013.01); *H04W 64/003* (2013.01); *H04W 72/06* (2013.01); *H04W 72/04* (2013.01)
USPC ............ 370/329; 370/328; 370/331; 370/341

(58) Field of Classification Search
USPC ............ 370/329, 332; 455/436, 445; 725/110
See application file for complete search history.

(56) References Cited

U.S. PATENT DOCUMENTS

| | | | |
|---|---|---|---|
| 7,386,296 B2 * | 6/2008 | Karaoguz et al. | 455/408 |
| 7,916,698 B2 * | 3/2011 | Ou et al. | 370/331 |
| 8,064,906 B1 * | 11/2011 | Bonner | 455/435.1 |
| 8,149,788 B1 * | 4/2012 | Vargantwar | 370/331 |
| 2007/0147391 A1 * | 6/2007 | Wilhoite et al. | 370/395.52 |
| 2007/0275726 A1 * | 11/2007 | Lee et al. | 455/436 |
| 2008/0261514 A1 * | 10/2008 | Pratt et al. | 455/3.06 |
| 2009/0094662 A1 * | 4/2009 | Chang et al. | 725/141 |
| 2009/0106346 A1 * | 4/2009 | Klein et al. | 709/201 |
| 2009/0190550 A1 * | 7/2009 | Giustina et al. | 370/331 |
| 2009/0286510 A1 * | 11/2009 | Huber et al. | 455/410 |
| 2009/0325713 A1 * | 12/2009 | Cansler et al. | 463/42 |
| 2010/0205049 A1 * | 8/2010 | Long et al. | 705/14.5 |
| 2012/0002640 A1 * | 1/2012 | Baluja et al. | 370/331 |
| 2012/0051295 A1 * | 3/2012 | Ergen | 370/329 |

* cited by examiner

*Primary Examiner* — Ian N Moore
*Assistant Examiner* — Phong La
(74) *Attorney, Agent, or Firm* — Timberline Patent Law Group PLLC

(57) ABSTRACT

The invention provides a method and system for automatically managing one or more operations of one or more IPTVs located in a femtocell network. The femtocell network includes one or more femtocell base stations. The one or more femtocell base stations determine presence information of one or more mobile stations located in the femtocell network. Thereafter, the one or more femtocell base stations transfer the presence information to a controller. In response to receiving the presence information of the one or more mobile stations, the controller manages the one or more operations of the one or more IPTVs.

10 Claims, 5 Drawing Sheets

METHOD AND SYSTEM FOR AUTOMATICALLY MANAGING OPERATIONS OF AN IPTV LOCATED IN A FEMTOCELL NETWORK

FIELD OF THE INVENTION

The invention generally relates to managing operations of an Internet Protocol Television (IPTV). More specifically, to a method and system for automatically managing operations of an IPTV located in a femtocell network.

BACKGROUND OF THE INVENTION

A femtocell base station is typically utilized for improving mobile network coverage in areas having limited or no connectivity. The femtocell base station is a small cellular base station that is designed to be used in residential or small business environments for extending service coverage of a mobile operator. The femtocell base station connects to the mobile operator's infrastructure over the customer's backhaul connections such as Asymmetric Digital Subscriber Line (ADSL), cable, Worldwide Interoperability for Microwave Access (WiMAX), and 3rd Generation Partnership Project Long Term Evolution (3GPP LTE). Femtocell base stations can be used for providing functionalities such as location update, handover, voice call, and video call on a mobile station used by a customer located in a femtocell associated with each femtocell base station. The femtocell corresponds to a coverage area associated with each femtocell base station. As a result of the extended service coverage, the mobile operator is able to provide services to the customer present in the femtocell, as well.

The customer's backhaul connections are also used for delivering a plurality of services on devices that are associated with the customer present in the femtocell. Example of one such device is an IPTV that is connected to the internet using the customer's backhaul connections. The IPTV receives real time video or on-demand video that is streamed from a server residing in the internet. The customer avails the services provided on the IPTV by subscribing to an IPTV service provider. After subscribing, the customer selects a content type that he/she desires to watch on the IPTV. Thereafter, the selected content is rendered on the IPTV of the customer. Additionally, the customer may also be provided with content such as advertisements on the IPTV for enhancing the customer experience when accessing the IPTV.

Typically, the customer has to manually manage operations of the IPTV in order to avail the IPTV services. Examples of such operations include switching-on of the IPTV, switching-off of the IPTV, and swapping content that is rendered on the IPTV. When more than one customer is required to access a single IPTV present in a femtocell, deciding on the content that needs to be rendered on the IPTV becomes a complex task. Moreover, it becomes difficult to determine the type of advertisements that need to be delivered on the IPTV in such a scenario. Further, when the customer accesses different IPTVs located across a femtocell network at various instances, the customer is required to perform various operations again every time the customer accesses a different IPTV.

Therefore, there is a need for a method and a system that automatically manages operations of an IPTV located in a femtocell network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
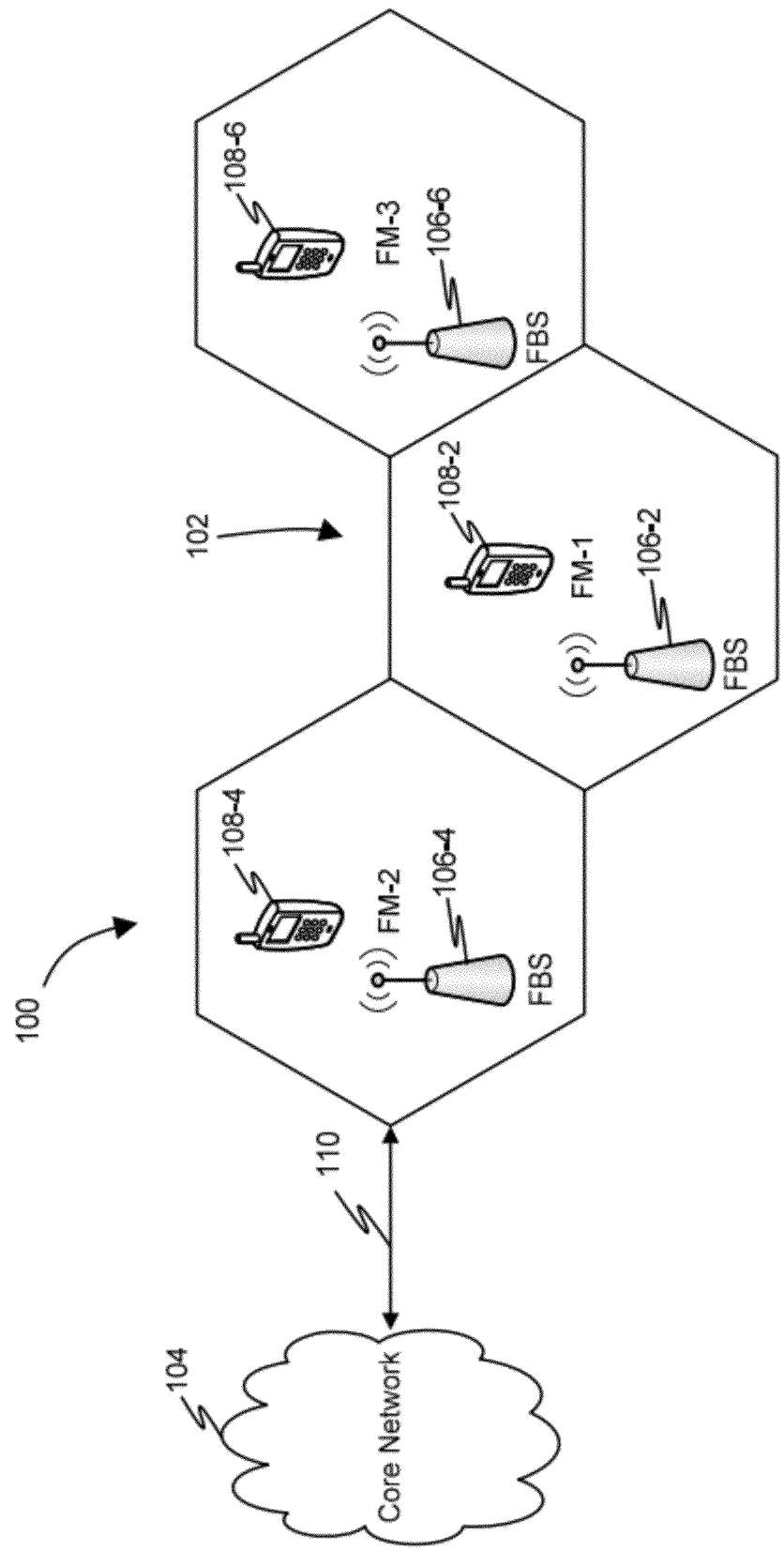
FIG. 1 illustrates an environment 100 (that is exemplary) in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to a method and system for automatically managing operations of an IPTV located in a femtocell network. Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions.

Various embodiments of the invention provide a method and system for automatically managing one or more operations of one or more IPTVs located in a femtocell network. The femtocell network includes one or more femtocell base stations. The method includes determining presence information of one or more mobile stations in the femtocell network using the one or more femtocell base stations. The method further includes managing the one or more operations of the one or more IPTVs in response to receiving the presence information of the one or more mobile stations from the one or more femtocell base stations.

FIG. 1 illustrates an environment 100 (that is exemplary) in which various embodiments of the invention may function. Environment 100 includes a femtocell network 102 that is connected to a core network 104. Core network 104 provides various services to customers who are connected to femtocell network 102. Femtocell network 102 is designed to be used in a residential or small business environment for extending service coverage of core network 104. For example, femtocell network 102 may be used for extending service coverage of core network 104 in a restaurant where access may be limited or unavailable. Femtocell network 102 includes a plurality of femtocells FM-n. The plurality of femtocells FM-n includes a femtocell FM-1, a femtocell FM-2, and a femtocell FM-3 as shown in FIG. 1. It will be evident to a person skilled in the art that the shape of a femtocell of the plurality of femtocells FM-n in FIG. 1 is representative and there may be other representations that are different from the representation shown in FIG. 1.

Further, femtocell network 102 includes one or more femtocell base stations FBS 106-n. Each femtocell base station of one or more FBS 106-n is associated with a corresponding femtocell of the plurality of femtocells FM-n. A femtocell of the plurality of femtocells FM-n associated with a femtocell base station of one or more FBS 106-n corresponds to a coverage area of the femtocell base station. One or more FBS 106-n include a FBS 106-2, a FBS 106-4, and a FBS 106-6. A femtocell base station of one or more FBS 106-n is essentially a small cellular base station that is designed for providing service coverage in a corresponding femtocell associated with it. Thus, each femtocell base station of one or more FBS 106-n is associated with a femtocell of the plurality of femtocells FM-n in femtocell network 102. For example, FBS 106-2 is associated with femtocell FM-1. Similarly, FBS 106-4 is associated with femtocell FM-2 and FBS 106-6 is associated with femtocell FM-3.

One or more FBS 106-n connect one or more mobile stations 108-n present in each femtocell of the plurality of femtocells FM-n to core network 104 over a backhaul connection 110. Examples of backhaul connection 110 may include Asymmetric Digital Subscriber Line (ADSL), cable, Worldwide Interoperability for Microwave Access (WiMAX), and 3rd Generation Partnership Project Long Term Evolution (3GPP LTE). The one or more mobile stations such as a mobile station 108-2, a mobile station 108-4, and a mobile station 108-6 are facilitated to use various services such as voice calls, video calls, text-based services, and multimedia services offered by core network 104 through backhaul connection 110. For example, mobile station 108-2, mobile station 108-4, and mobile station 108-6 are connected to core network 104 by FBS 106-2, FBS 106-4, and FBS 106-6, respectively, over backhaul connection 110 as shown in FIG. 1. It will be evident to a person skilled in the art that only three mobile stations are represented in FIG. 1 for the sake of clarity and a plurality of mobile stations may be present in each femtocell of the plurality of femtocells FM-n in femtocell network 102. Further, the one or more FBS 106-n perform various functions such as location update, and handover of the one or more mobile stations 108-n within femtocell network 102. In an embodiment, one or more FBS 106-n may perform handover of one or more mobile stations 108-n to a macro base station present in a macrocell network. The macrocell network has a wider coverage than femtocell network 102.

Figure 2:
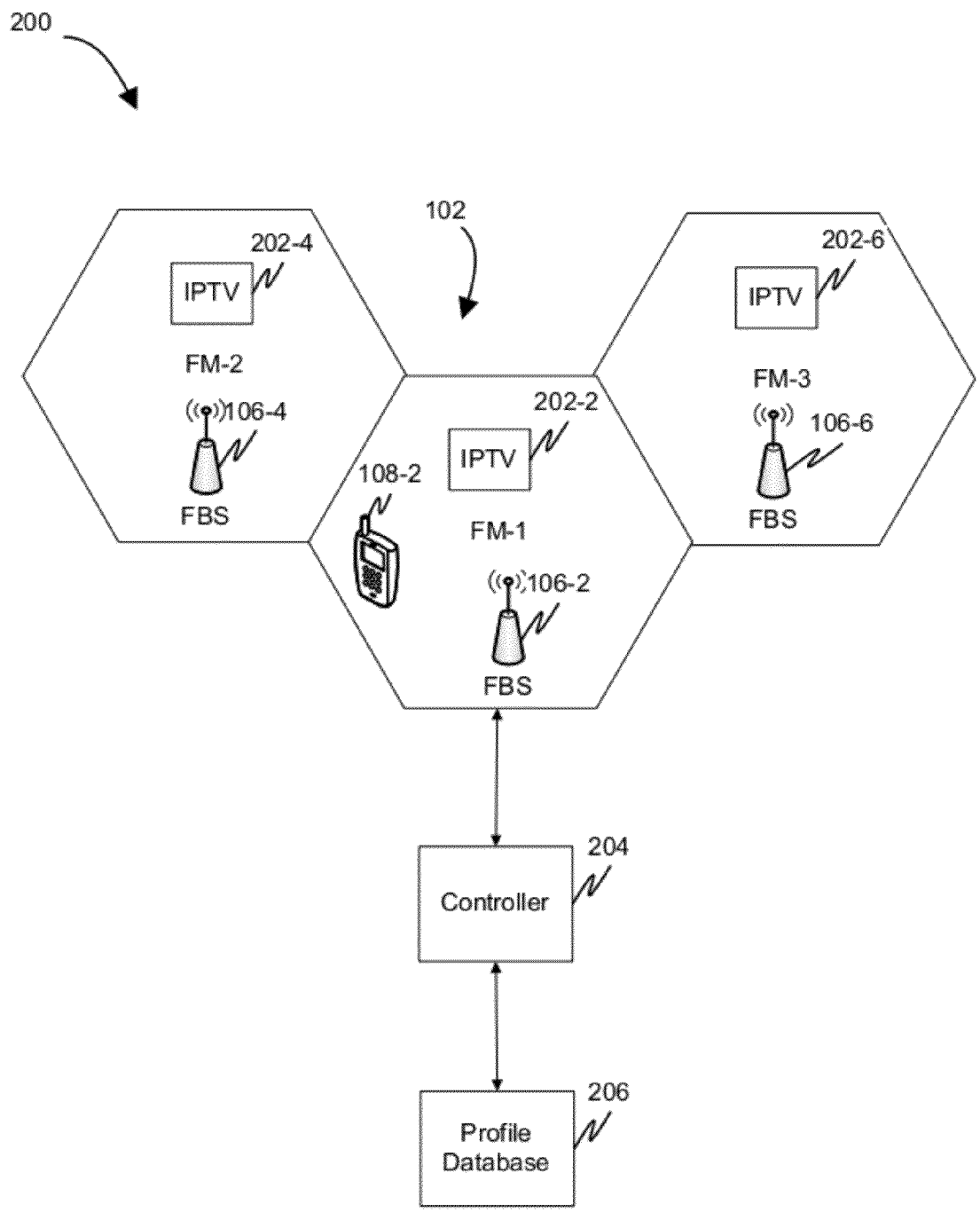
FIG. 2 illustrates a system for managing one or more operations of one or more Internet Protocol Televisions (IPTVs) located in a femtocell network in accordance with an embodiment of the invention.

FIG. 2 illustrates a system 200 for managing one or more operations of one or more Internet Protocol Televisions (IPTVs) located in femtocell network 102 in accordance with an embodiment of the invention. Femtocell network 102 may correspond to a communication network associated with a residential or small business environment. Femtocell network 102 includes one or more IPTVs 202-n as shown in FIG. 2. One or more IPTVs 202-n include an IPTV 202-2 present in femtocell FM-1, an IPTV 202-4 present in femtocell FM-2, and an IPTV 202-6 present in femtocell FM-3. An IPTV is a TV set with a set top box that has been configured to receive interactive TV and multimedia services over an IP based data network. In an embodiment, one or more IPTVs 202-n may be co-located with one or more FBS 106-n present in femtocell network 102. For instance, one or more IPTVs 202-n may be co-located in a single gateway box with one or more FBS 106-n. Similarly, one or more IPTVs 202-n may be co-located in separate gateway boxes with one or more FBS 106-n.

Each IPTV of one or more IPTVs 202-n is configured to receive content from core network 104 over backhaul connection 110 associated with the residential or small business environment. For example, one or more IPTVs 202-n may receive real time or on-demand video from a streaming server residing in core network 104 over backhaul connection 110. In order to access the content delivered on an IPTV of one or more IPTVs 202-n, a user associated with one or more mobile stations 108-n needs to be present in a femtocell that includes the IPTV. For example, as shown in FIG. 2, a user of mobile station 108-2 may access an IPTV 202-2 present in femtocell FM-1 as the user is located in femtocell FM-1. In the same manner, the user of mobile station 108-2 may access IPTV 202-4 when the user traverses to femtocell FM-2. While a user is accessing an IPTV, the IPTV may be controlled by performing one or more operations so as to display appropriate content to the user. The one or more operations may include for example, switching on one or more IPTVs 202-n, switching off one or more IPTVs 202-n, altering volume of one or more IPTVs 202-n, and rendering a channel of a plurality of channels on one or more IPTVs 202-n.

In order to automatically manage the one or more operations of one or more IPTVs 202-n, a controller 204 is provided in system 200. Controller 204 is configured to interact with each IPTV of one or more IPTVs 202-n. Further, controller 204 is adaptively coupled to one or more FBS 106-n present in femtocell network 102. In an embodiment, controller 204 automatically manages the one or more operations of one or more IPTVs 202-n based on presence information of one or more mobile stations 108-n in femtocell network 102. Controller 204 obtains the presence information regarding one or more mobile stations 108-n from one or more FBS 106-n. The presence information of one or more mobile stations 108-n in femtocell network 102 may be determined while performing handover or reselection of one or more mobile stations 108-n. For example, when mobile station 108-2 is in a communication range of FBS 106-2, mobile station 108-2 tries to camp on to FBS 106-2 or hand-in to FBS 106-2 if it is in a voice or data session. Further, presence may also be determined when mobile station 108-2 traverses from femtocell FM-1 to another femtocell of the plurality of femtocells FM-n in femtocell network 102.

Accordingly, once the presence information of one or more mobile stations 108-n is determined, one or more FBS 106-n transfer the presence information to controller 204. In response to receiving the presence information of one or more mobile stations 108-n, controller 204 allows one or more mobile stations 108-n to access one or more IPTVs 202-n in corresponding femtocells FM-n. Thereafter, controller 204 manages the one or more operations of one or more IPTVs 202-n. For example, controller 204 may switch on IPTV 202-2 when mobile station 108-2 camps on to femtocell FM-1 which contains IPTV 202-2. In the same manner, controller 204 may switch off IPTV 202-2 when mobile station 108-2 leaves femtocell FM-1. Further, if it is determined that the user of mobile station 108-2 has started a call session, controller 204 may alter the volume of IPTV 202-2. In the same manner, controller 204 may increase the volume of IPTV 202-2 when it determines that the user of mobile station 108-2 has ended the call session. In an embodiment, controller 204 may record content information that is being delivered on IPTV 202-2 when it determines that mobile station 108-2 has left femtocell FM-1.

In an embodiment, while determining the presence information of one or more mobile stations 108-$n$, controller 204 may authenticate the user of one or more mobile stations 108-$n$. For example, the user of one or more mobile stations 108-$n$ may be authenticated by controller 204 when one or more mobile stations 108-$n$ enter a coverage area of a femtocell base station of one or more FBS 106-$n$. For example, controller 204 may authenticate a user of one or more mobile stations 108-$n$ when one or more mobile stations 108-$n$ send a request to controller 204 for availing services of one or more IPTVs 202-$n$. After authenticating the user of one or more mobile stations 108-$n$, controller 204 retrieves a user profile of the user of one or more mobile stations 108-$n$ from a profile database 206.

The user profile of the user of one or more mobile stations 108-$n$ includes one or more of a user name, a user identifier, a user account, a priority level associated with the user, and viewing habits of the user. Based on the retrieved user profile, controller 204 performs the one or more operations on one or more IPTVs 202-$n$. For example, controller 204 may render a channel of a plurality of channels on an IPTV of one or more IPTVs 202-$n$ based on viewing habits of the user as specified in the user profile of the user. For instance, if there is only a child in a home, controller 204 may allow only cartoon channels to be rendered on an IPTV present in the home. In order to build the viewing habits as specified in the user profile of the user, controller 204 extracts information associated with a channel of a plurality of channels that is watched by each user of one or more mobile stations 108-$n$ and a duration for which the channel is watched by each user.

Further, when more than one user is present and accessing an IPTV of one or more IPTVs 202-$n$ present in a femtocell of the plurality of femtocells FM-n, controller 204 may retrieve a user profile associated with each user in the femtocell in order to determine a priority level associated with each user. After determining the priority level of each user, controller 204 may give a preference to a higher priority user in order to manage the one or more operations of the IPTV. For example, if there are two kids and an adult in a home network, controller 204 may give higher priority to the adult while rendering content on an IPTV located in the home network.

In an embodiment, controller 204 may render customized content based on the retrieved user profile of the user of one or more mobile stations 108-$n$. The customized content may correspond to an advertisement. Controller 204 may analyze the user profile of the user for determining advertisements that are relevant to the user profile. Controller 204 may analyze information such as viewing habits of the user, a last viewed content by the user, and profile information associated with the user for determining the advertisements that may be relevant to the user profile. This is further explained in conjunction with FIG. 3.

In an embodiment, controller 204 may record content information rendered on one or more IPTVs 202-$n$ in order to update the user profile associated with each mobile station of one or more mobile stations 108-$n$. For example, controller 204 may retrieve information associated with a selected channel or on-demand video requested by the user of one or more mobile stations 108-$n$. Thereafter, controller 204 may correlate the presence information associated with one or more mobile stations 108-$n$ with the selected channel or on-demand video requested by the user of one or more mobile stations 108-$n$. The correlation information is used for updating the user profile associated with each mobile station of one or more mobile stations 108-$n$.

For example, controller 204 may maintain statistics for one or more mobile stations 108-$n$ that are accessing an IPTV of one or more IPTVs 202-$n$ when the IPTV is determined to be switched on. In the same manner, controller 204 may maintain statistics about one or more mobile stations 108-$n$ that are present when the IPTV is switched off. Based on the statistics, controller 204 determines a time and duration for which each mobile station is present in femtocell network 102 and avails the services of one or more IPTVs 202-$n$. In an embodiment, a plurality of users may be accessing one or more IPTVs 202-$n$. In such a scenario, controller 204 may utilize the statistics associated with each user of one or more mobile stations 108-$n$ to determine a priority level associated with each user. Thus, controller 204 renders content on one or more IPTVs 202-$n$ based on the priority level associated with each user of one or more mobile stations 108-$n$.

In an embodiment, a group profile may be created based on statistics associated with one or more mobile stations 108-$n$. The group profile may include information about an access right associated with each user of one or more mobile stations 108-$n$. The access right associated with each user determines a content that is accessible to each user. For example, an access right associated with a child may determine a channel of a plurality of channels that is accessible to the child. Thus, the access right may restrict the child from watching content or a channel that is not appropriate for children. Consequently, when a plurality of users are accessing one or more IPTVs 202-$n$, each user may be allowed to access content on an IPTV of one or more IPTVs 202-$n$ based on presence information associated with the user and access right associated with the user which is stored in the group profile.

Further, the statistics may also be used to identify a subset of users of one or more mobile stations 108-$n$ who do not avail the services of one or more IPTVs 202-$n$. Controller 204 may also build statistics associated with a zapping ratio of one or more mobile stations 108-$n$. The zapping ratio is used to determine a frequency of swapping channels by the one or more mobile stations 108-$n$ on the one or more IPTVs 202-$n$. Thus, the statistics provide controller 204 information about each user of one or more mobile stations 108-$n$. Accordingly, controller 204 updates the user profile associated with each mobile station based on the statistics.

Additionally, controller 204 may also update the user profile associated with each mobile station based on a watching behavior for each mobile station of one or more mobile stations 108-$n$. The watching behavior for each mobile station includes information about selected channels that are accessed by the user of each mobile station and a time duration for which each mobile station accessed the IPTV. For example, controller 204 may determine a preferred channel for a mobile station of one or more mobile stations 108-$n$ based on the watching behavior of the mobile station.

Figure 3:
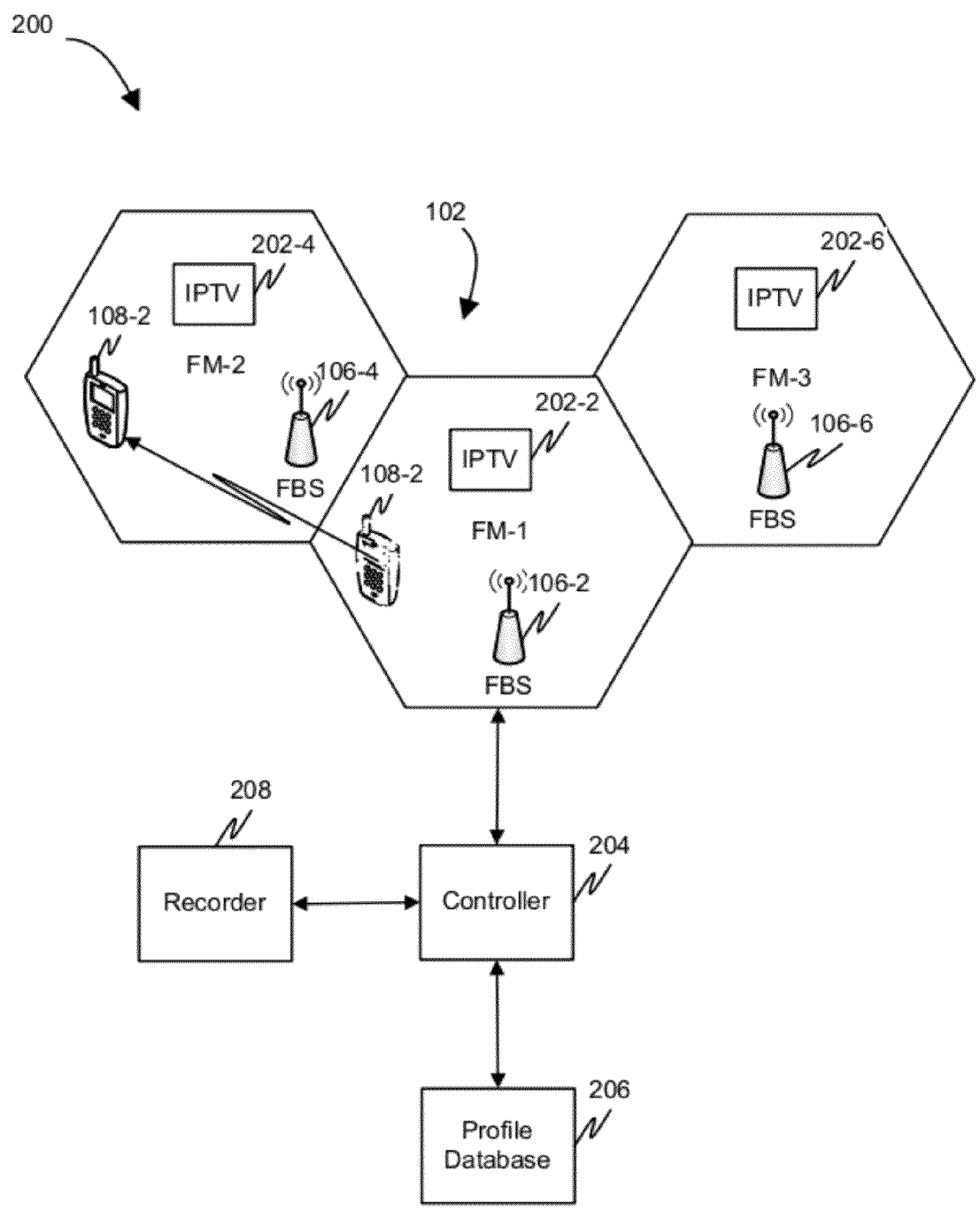
FIG. 3 illustrates a system for managing one or more operations of one or more IPTVs located in a femtocell network while a mobile station traverses from one femtocell to another femtocell in accordance with another embodiment of the invention.

FIG. 3 illustrates system 200 for managing one or more operations of one or more IPTVs 202-$n$ located in femtocell network 102 while a mobile station traverses from one femtocell to another femtocell in accordance with another embodiment of the invention. Based on the retrieved presence information associated with one or more mobile stations 108-$n$, controller 204 obtains information pertaining to a last viewed content by a user of one or more mobile stations 108-$n$ on an IPTV of one or more IPTVs 202-$n$ that is associated with a last serving femtocell base station. Information associated with the last viewed content is retrieved from the last serving femtocell base station during a handover process of one or more mobile stations 108-$n$. In an embodiment, the information associated with the last viewed content may include information associated with a channel that was last viewed by the user in the last serving femtocell base station, and a playback position information of the last viewed content. For example, as shown in FIG. 3, mobile station 108-2 has traversed from femtocell FM-1 to femtocell FM-2. In order to traverse from femtocell FM-1 to femtocell FM-2, mobile station 108-2 needs to undergo a handover from FBS 106-2 to FBS 106-4. While performing the handover, controller 204 obtains information pertaining to the last viewed content by the user of mobile station 108-2 on IPTV 202-2 when the user was present in femtocell FM-1.

After obtaining information associated with the last viewed content, controller 204 utilizes the information to manage the one or more operations of one or more IPTVs 202-n. For example, if the user of mobile station 108-2 was viewing a sports channel on IPTV 202-2 located in femtocell FM-1, controller 204 may obtain information associated with the sports channel during handover of mobile station 108-2 from femtocell FM-1 to femtocell FM-2. Based on the obtained information, controller 204 may render the same sports channel on IPTV 202-4 located in femtocell FM-2. As a result, the user of mobile station 108-2 receives a continuous delivery of the sports channel even when the user of mobile station 108-2 shifts from one femtocell to another femtocell in femtocell network 102.

In an embodiment, controller 204 may direct a recorder 208 to record content information rendered on one or more IPTVs 202-n to update viewing habits of each user of one or more mobile stations 108-n located in femtocell network 102. Recorder 208 is configured to store content information associated with content rendered on one or more IPTVs 202-n. Examples of recorder 208 may include a Digital Video Recorder (DVR), a Personal Video Recorder (PVR), a set-top box with recording facility, a portable media player with recording facility, and digital camcorders. After receiving the presence information associated with one or more mobile stations 108-n from one or more FBS 106-n, controller 204 determines whether to record content information rendered on one or more IPTVs 202-n. For example, after receiving presence information associated with mobile station 108-2 in femtocell FM-1, controller 204 may direct recorder 208 to start recording content information rendered on IPTV 202-2 located in femtocell FM-1.

Controller 204 may use the recorded content information rendered on one or more IPTVs 202-n to build statistics for each user of one or more mobile stations 108-n. For example, controller 204 may use the recorded content information rendered on IPTV 202-2 located in femtocell FM-1 to build statistics for the user of mobile station 108-2. The statistics are used for updating user profile of each user of one or more mobile stations 108-n. This has already been explained in FIG. 2. In an embodiment, controller 204 may direct recorder 208 to record the content information as long as the users of one or more mobile stations 108-n are present in femtocell network 102. For example, once the user of mobile station 108-2 traverses from femtocell FM-1 to femtocell FM-2, controller 204 may direct recorder 208 to stop recording the content information rendered on IPTV 202-2 located in femtocell FM-1. In an embodiment, recorder 208 may record the content along with the content information such that the users of one or more mobile station 108-n may consume the recorder content at a later stage.

In an embodiment, the user of mobile station 108-2 may power on mobile station 108-2 at a specified time. When controller 204 receives presence information associated with mobile station 108-2, controller 204 may direct recorder 208 to start recording content information rendered on IPTV 202-2 in which mobile station 108-2 is currently located. If the user of mobile station 108-2 powers off mobile station 108-2 at a later point in time, controller 204 may direct recorder 208 to stop recording content information rendered on IPTV 202-2. Based on the recorded content information for which mobile station 108-2 was in a power-on state, controller 204 may update the viewing habits in the user profile of the user associated with mobile station 108-2. Thus, controller 204 updates viewing habits in user profile of each user of one or more mobile stations 108-n based on the recorded content information associated with each user.

Figure 4:
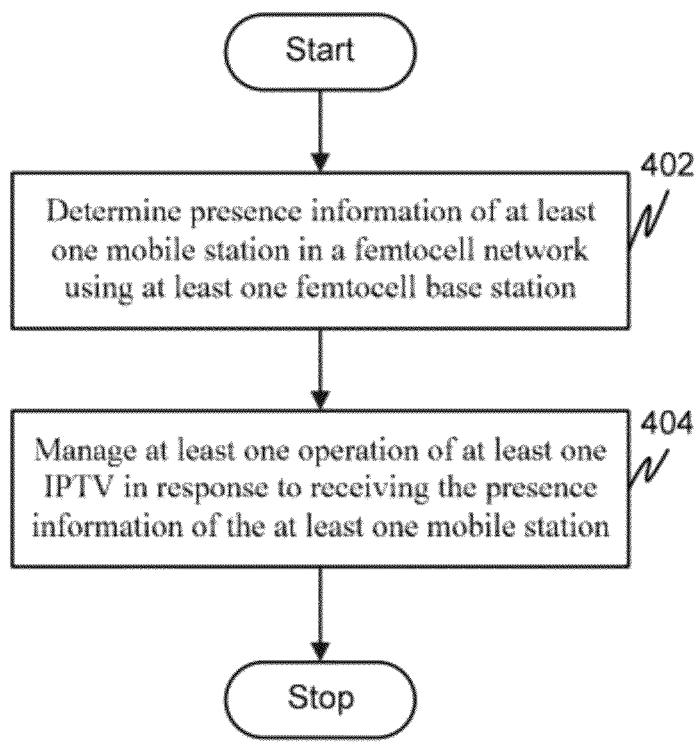
FIG. 4 illustrates a flowchart of a method for managing one or more operations of one or more IPTVs located in a femtocell network in accordance with an embodiment of the invention.

FIG. 4 illustrates a flowchart of a method for managing one or more operations of one or more IPTVs 202-n located in femtocell network 102 in accordance with an embodiment of the invention. Femtocell network 102 includes a plurality of femtocells FM-n and one or more femtocell base stations FBS 106-n. Each femtocell of the plurality of femtocells FM-n is associated with a femtocell base station of one or more FBS 106-n. This has already been explained in FIG. 1. One or more FBS 106-n provide various services to one or more mobile stations 108-n that are present in femtocell network 102. Further, one or more FBS 106-n are configured to interact with one or more IPTVs 202-n located in femtocell network 102.

At step 402, one or more FBS 106-n determine presence information associated with one or more mobile stations 108-n. This is further explained in conjunction with FIG. 5. After determining the presence information associated with one or more mobile stations 108-n, one or more FBS 106-n transfer the presence information to controller 204. Thereafter, at step 404, controller 204 manages the one or more operations of one or more IPTVs 202-n in response to receiving the presence information of one or more mobile stations 108-n. The one or more operations may include for example, switching on one or more IPTVs 202-n, switching off one or more IPTVs 202-n, altering volume of one or more IPTVs 202-n, and rendering a channel of a plurality of channels on one or more IPTVs 202-n.

Figure 5:
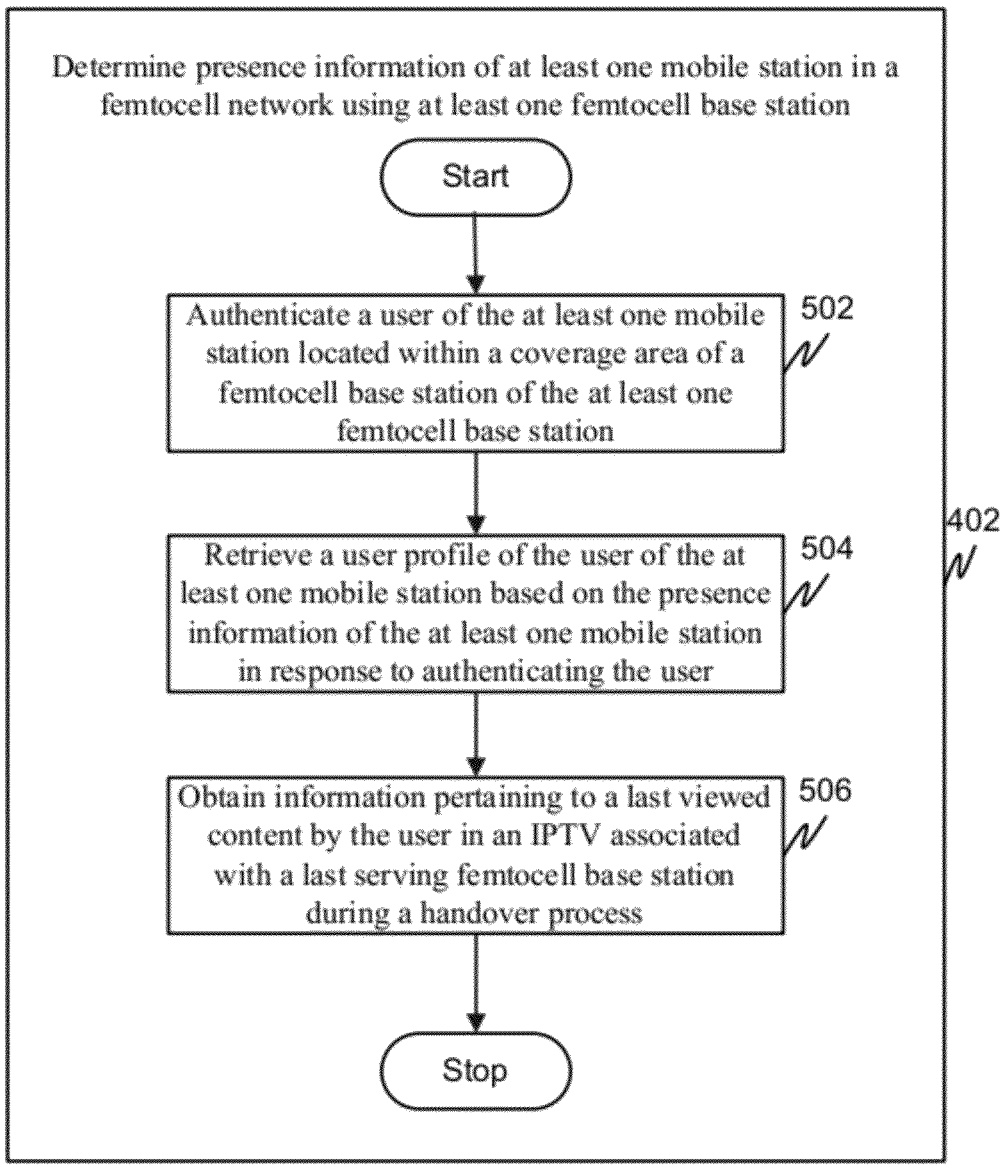
FIG. 5 illustrates a flowchart of a method for determining presence information of the one or more mobile stations located in a femtocell network in accordance with an embodiment of the invention.

FIG. 5 illustrates a flowchart of a method for determining presence information of one or more mobile stations 108-n located in femtocell network 102 in accordance with an embodiment of the invention. As mentioned in FIG. 4, one or more FBS 106-n determine presence information associated with one or more mobile stations 108-n at step 402. Subsequent to determination of the presence information of one or more mobile stations 108-n, controller 204, authenticates a user of one or more mobile stations 108-n at step 502. In an embodiment, the user of one or more mobile stations 108-n located in a femtocell of the plurality of femtocells FM-n is authenticated when the user sends a request to avail services.

Thereafter, at step 504, controller 204 retrieves a user profile of the user of one or more mobile stations 108-n from a profile database 206 in response to authenticating the user. The user profile of the user includes one or more of a user name, a user identifier, a user account, a priority level associated with the user, and viewing habits of the user. At step 506, controller 204 obtains information associated with a last viewed content by the user on an IPTV of one or more IPTVs 202-n associated with a last serving femtocell base station of one or more FBS 106-n. Information associated with the last viewed content is obtained from the last serving femtocell base station during a handover process. This has already been explained in FIG. 2. Based on the last viewed content and the retrieved user profile of the user, controller 204 manages the one or more operations of the IPTV of one or more IPTVs 202-n. Examples of the one or more operations include switching on the IPTV, switching off the IPTV, pausing the IPTV, altering volume of the IPTV, and rendering a channel of a plurality of channels on the IPTV. Controller 204 may also render a customized content on the IPTV based on the presence information, information pertaining to the last viewed content, and the user profile of the user associated with one or more mobile stations 108-$n$ located in femtocell network 102.

In an embodiment, the customized content may correspond to advertisements. For example, controller 204 may render an advertisement on the IPTV based on the last viewed content by the user on an IPTV of the one or more IPTVs associated with a last serving femtocell base station of one or more FBS 106-$n$. In a scenario, if the last viewed content corresponds to a football match, controller 204 may select an advertisement that is related to sports for rendering the advertisement on the IPTV. In the same manner, controller 204 may analyze the user profile of the user for selecting the advertisements. In a scenario, if analysis of the user profile discloses that the user watches a culinary channel of a plurality of channels for a maximum duration of time in a day, controller 204 may select an advertisement that is related to homemade appliances for rendering on the IPTV.

Additionally, controller 204 may direct a recorder 208 to record content information rendered on the IPTV based on the presence information associated with one or more mobile stations 108-$n$. For example, controller 204 may direct recorder 208 to record the content information delivered on the IPTV if it is determined that a mobile station of one or more mobile stations 108-$n$ is currently positioned in the femtocell that houses the IPTV. Similarly, if it is determined that the mobile station has traversed from the femtocell that houses the IPTV to another femtocell of the plurality of femtocells FM-n, controller 204 may direct recorder 208 to stop recording the content information that is rendered on the IPTV. In an embodiment, controller 204 may use the information associated with the recorded content information for updating the viewing habits of the user associated with the mobile station.

Consider an exemplary embodiment of the invention as described herein, wherein one or more mobile stations are associated with a femtocell network in a house. The femtocell network is connected to a core network over a backhaul connection associated with the house. The one or more mobile stations include a first mobile station, a second mobile station, and a third mobile station. The first mobile station may belong to a husband in the house, the second mobile station may belong to a wife in the house, and the third mobile station may belong to a child in the house. The femtocell network includes one or more femtocells, wherein the one or more femtocells correspond to a first femtocell, a second femtocell and a third femtocell. Each femtocell of the one or more femtocells is associated with a corresponding femtocell base station. Thus, the first femtocell is associated with a first femtocell base station, the second femtocell is associated with a second femtocell base station, and the third femtocell is associated with a third femtocell base station in the femtocell network. The first femtocell base station may be located in a bedroom in the house, the second femtocell base station may be located in a kitchen in the house, and the third femtocell base station may be located in a dining room in the house.

Further, each femtocell includes a corresponding IPTV. Thus, the first femtocell includes a first IPTV, the second femtocell includes a second IPTV, and the third femtocell includes a third IPTV. The first IPTV may be located in the bedroom, the second IPTV may be located in the kitchen, and the third IPTV may be located in the dining room. Each IPTV is configured to receive content from the core network over the backhaul connection. For example, the first IPTV may receive real time or on-demand video from a streaming server residing in the core network. In order to access content delivered on each IPTV, users of the one or more mobile stations have subscribed to the IPTV services. When the one or more mobile stations are located within the femtocell network, a user associated with the one or more mobile stations is allowed to access content delivered on the one or more IPTVs. Each IPTV of the one or more IPTVs may be controlled by performing one or more operations. Examples of the one or more operations may include switching on the one or more IPTVs, switching off the one or more IPTVs, altering volume of the one or more IPTVs, and rendering a channel of a plurality of channels on the one or more IPTVs.

In order to manage the one or more operations of the one or more IPTVs, a controller is provided in the femtocell network of the house. The controller is adaptively coupled to each femtocell base station and is configured to interact with each IPTV in the femtocell network. The one or more operations on the one or more IPTVs are performed by the controller based on presence information of the one or more mobile stations. For example, consider a scenario in the house where the husband and the child have left for office and school, respectively. Also, consider that the wife is in the kitchen and powers-on the second mobile station associated with her. As soon as the second mobile station is powered on, the second mobile station tries to camp on to the second femtocell base station. Subsequently, the second femtocell base station located in the kitchen determines presence information of the second mobile station.

After determining the presence information of the second mobile station, the second femtocell base station transfers the presence information to the controller. In response to receiving the presence information of the second mobile station, the controller allows the wife who is associated with the second mobile station to access the second IPTV. Thereafter, the controller may perform the one or more operations on the second IPTV in response to receiving the presence information associated with the second mobile station. For example, the controller may switch on the second IPTV in response to receiving the presence information about the second mobile station. At a later stage in time, the wife may move from the kitchen to the bedroom. When this happens, the controller is informed that the wife has shifted from the kitchen to another location in the house. As a result, the controller may switch off the second IPTV.

In an embodiment, the controller may authenticate the wife before giving her access to the second IPTV. The controller may authenticate the wife while receiving the presence information associated with the second mobile station. After authenticating the wife, the controller retrieves a user profile of the wife. The user profile of the wife may include one or more of a wife's name, wife's identifier, an account number, a priority level associated with the wife, and viewing habits of the wife. Based on the retrieved user profile of the wife, the controller performs the one or more operations on the second IPTV. For example, the controller may render a channel of a plurality of channels based on the viewing habits of the wife.

The controller may also render customized content based on the retrieved user profile of the wife. In an embodiment, the customized content may correspond to an advertisement. In order to select the customized content that needs to be rendered on the second IPTV, the controller may analyze the user profile of the wife. As a result, the controller may identify a set of targeted advertisements that may be relevant to the wife based on the analysis performed on the user profile of the wife. For example, the controller may determine that the wife watches a culinary channel of a plurality of channels for a maximum duration of time in a day. Based on the analysis, the controller may select one or more advertisements that are related to homemade appliances. The selected advertisements are delivered on the second IPTV. If the wife is interested in the advertisement, she may take a subsequent action such as clicking on the advertisement or calling up a phone number displayed in the advertisement.

In another embodiment, where the wife has shifted from the kitchen to the bedroom, the controller receives the presence information associated with the wife from the first femtocell base station. The presence information is determined by the first femtocell base station when the second mobile station associated with the wife camps on to the first femtocell base station. When the controller receives the presence information associated with the second mobile station in the bedroom, the controller may switch on the first IPTV located in the bedroom. Further, in such a scenario, the controller may obtain information associated with a last viewed content associated with the second mobile station of the wife from a last serving femtocell base station. In the current scenario, the last serving femtocell base station corresponds to the second mobile station located in the kitchen. Information about the last viewed content is obtained during a handover process of the second mobile station from the second femtocell base station to the first femtocell base station.

After obtaining information associated with the last viewed content, the controller may perform one or more operations on the first IPTV based on the obtained information. For example, if it is determined that the wife was watching a news channel in the second IPTV located in kitchen, wherein the kitchen corresponds to the last serving femtocell base station, the controller may automatically render the same news channel on the first IPTV located in the bedroom. Further, the controller may also determine a playback position of the last viewed content. The controller may utilize this playback information to start rendering the content on the first IPTV in the bedroom from the exact location till where the wife had received and consumed the content on the second IPTV in the kitchen.

Further, consider that at a later stage in time, the wife leaves the house for some time. When the controller receives presence information about the wife and determines that the wife is no longer present in the bedroom or in the house, the controller may direct a recorder present in the house to start recording content information that is being delivered on the first IPTV located in the bedroom. In an embodiment, the recorder may record the content as well along with the content information. This ensures that the wife may access the rendered content that was delivered in her absence at a later stage in time.

Also, consider that during the time when the wife was not present in the house, the child enters the house and is present in the dining room. The third mobile station associated with the child camps on to the third femtocell base station. Subsequently, the third femtocell base station determines the presence information about the child and transfers the presence information to the controller. In response to receiving the presence information about the child, the controller may switch on the third IPTV, retrieve a user profile associated with the child and start rendering content on the third IPTV based on the retrieved presence information associated with the child and the retrieved user profile associated with the child. For example, the controller may switch on the third IPTV and start rendering a cartoon channel on the third IPTV based on the retrieved user profile of the child.

In the evening when the husband returns to the house, the husband, the wife and the child may all be seated in the dining room for having dinner. The third femtocell base station may determine the presence information associated with the husband, the wife, and the child and transfer the presence information to the controller. In response to receiving the presence information of the husband, the wife, and the child, the controller retrieves the user profile associated with the husband, the wife and the child. After retrieving the user profiles, the controller determines the priority level associated with the husband, the wife, and the child. Based on the priority level, the controller may determine that the husband has the highest priority when compared to the wife and the child. Thus, the controller renders content on the third IPTV based on the user profile of the husband. For example, the controller may render a sports channel that has been determined based on the user profile of the husband even though the wife, and the child are also present in the dining room. Further, the controller may insert advertisements on the third IPTV based on the user profile of the husband.

In an embodiment, the controller may record the content information that is delivered on each IPTV in the house and store information about the one or more mobile stations that are consuming the content rendered on each IPTV. Based on the recorded content information and information about the one or more mobile stations that are consuming the rendered content, the controller may update the user profile associated with each mobile station. The controller may build statistics about the content that is being rendered and the one or more mobile stations that are consuming the rendered content. Additionally, the controller may also store information about a time duration for which content is rendered on each IPTV and associate the time duration with the one or more mobile stations that are consuming the rendered content for the specified time duration.

Based on the statistics, the controller may determine viewing habits of each user of the one or more mobile stations. For example, if the husband watches a sports channel of a plurality of channels for a maximum duration of time, the controller determines that the husband prefers the sports channel when compared to the remaining plurality of channels. The viewing habits of each user may be used for determining a set of targeted advertisements that match the viewing habits of the user and are likely to be consumed by the user.

Various embodiments of the method and system described herein facilitate in automatically managing one or more operations of one or more IPTVs located in a femtocell network. The method and system manages the one or more operations based on presence information of one or more mobile stations located in the femtocell network. Further, the method and system also manage the one or more operations based on a user profile associated with the one or more mobile stations and a last viewed content associated with each user of the one or more mobile station in a last serving femtocell base station.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all of the claims. The present invention is defined solely by the appended claims including any amendments made during the pendency of this application and all equivalents of those claims as issued.

What is claimed is:

1. A method of automatically managing an IPTV located in a femtocell network based on a presence of a user in the femtocell network comprising:
    detecting a presence of a mobile device of the user in the femtocell network based on a femtocell base station sensing the presence of the mobile device, wherein the mobile device has no functionality to control an operation or a content of the IPTV;
    upon detecting the presence of the mobile device, retrieving a profile of the user from a controller associated with the base station; and
    selecting a television programming for the IPTV and at least one operation to be performed by the IPTV based on the profile of the user;
    wherein the at least one operation to be performed by the IPTV comprises one of switching on the IPTV when the user enters the femtocell network, pausing the IPTV based on a presence of a second user, switching off the IPTV when the user leaves the femtocell network, altering an audio volume of the IPTV when the user engages in a phone call on the mobile device, and rendering a channel of a plurality of channels on the IPTV based on the profile of the user;
    wherein rendering of a channel on the IPTV is performed based a presence of a user, information pertaining to a last viewed content, and a profile associated with each present user;
    rendering customized content on the IPTV based on the presence of a user, information pertaining to a last viewed content, and a profile of a present user;
    wherein the customized content is an advertisement retrieved based on a profile and a priority level of a user.

2. The method of claim 1, further comprising authenticating the user.

3. The method of claim 1, wherein retrieving the profile further comprises:
    obtaining information pertaining to a last viewed content by the user in an IPTV associated with a last serving femtocell base station during a handover process of the at least one mobile device from the last serving femtocell base station.

4. The method of claim 3, wherein the information pertaining to the last viewed content comprises a channel information and a playback position information.

5. The method of claim 1, wherein the profile comprises one of a user name, a user identifier, a user account, a priority level associated with the user, and viewing habits of the user.

6. The method of claim 1 further comprising initiating recording of a television programming content being rendered on the IPTV when the femtocell base station senses the mobile device of the user leaving the femtocell network or the femtocell base station senses a newly occurring absence of the mobile device of the user.

7. A system for managing at least one operation of at least one IPTV located in a femtocell network, the system comprising:
    at least one femtocell base station configured to determine presence information of at least one mobile station in the femtocell network, the at least one mobile station having no functionality to control an operation or a content of the at least one IPTV;
    a controller adaptively coupled to the at least one femtocell base station and configured to manage the at least one operation of the at least one IPTV in response to receiving the presence information of the at least one mobile station from the at least one femtocell base station;
    a user profile associated with the at least one mobile station and retrievable from a set of user profiles stored in the controller and associated with respective mobile stations;
    wherein the controller selects television programming for the IPTV and at least one operation to be performed by the IPTV based on the user profile;
    wherein the at least one operation to be performed by the IPTV comprises one of switching on the IPTV when the user enters the femtocell network, pausing the IPTV based on a presence of a second user, switching off the IPTV when the user leaves the femtocell network, altering an audio volume of the IPTV when the user engages in a phone call on the mobile device, and rendering a channel of a plurality of channels on the IPTV based on the profile of the user;
    wherein the controller is further configured to render customized content on the at least one IPTV based on a presence information, information pertaining to a last viewed content, and the user profile; and
    wherein the customized content is an advertisement retrieved based on the user profile and a priority level of a user.

8. The system of claim 7, wherein the controller is further configured to:
    authenticate a user of the at least one mobile station located within a coverage area of a femtocell base station in the femtocell network.

9. The system of claim 7, wherein the controller is further configured to obtain information pertaining to a last viewed content by the user in an IPTV associated with a last serving femtocell base station during a handover process of the at least one mobile station from the last serving femtocell base station.

10. The system of claim 7, wherein the controller is further configured to direct a recorder to record content information rendered on the at least one IPTV based on the presence information associated with each mobile station of the at least one mobile station in order to update viewing habits of each user as stored in the user profile of each user.

* * * * *